Patented Mar. 16, 1954

2,672,453

UNITED STATES PATENT OFFICE 2,672,453

MANUFACTURE OF SPHERICAL PARTICLES

Charles Wankat, Brookfield, Ill., assignor to Universal Oil Products Company, Des Plaines, Ill., a corporation of Delaware No Drawing. Application November 17, 1952, Serial No. 321,045

16 Claims. (Cl. 252—448)

This application is a continuation-in-part of my co-pending application Serial Number 208,231, filed January 27, 1951, now abandoned.

This invention relates to the manufacture of spherical particles and more particularly to an improvement in the process of manufacturing inorganic oxide particles of substantially spherical or spheroidal shape.

A recent method for the manufacture of spherical particles of inorganic oxides entails dispersing droplets of a sol in a water immiscible suspending medium wherein the droplets set into hydrogel spheres. During use in the process, the suspending medium, particularly when operated at an elevated temperature, undergoes deterioration and becomes unsatisfactory for further use to produce substantially spherical gel particles. The interfacial tension between the suspending medium and the sol decreases during this use and results in particles which are not substantially spherical but instead are flat or ellipsoidal.

Another disadvantage resulting from the continued use of the suspending medium at elevated temperature in this process is that the suspending medium tends to be retained by the spheres to a greater extent than when using fresh suspending medium. This results in a film of suspending medium on the gel particles and interferes with subsequent treatment of the gel particles with aqueous solutions. The film of suspending medium prevents efficient contact between the aqueous solution and the gel particles, with the result that either a poorer product is obtained or more aqueous solution is required to effect the desired treatment.

The present invention is directed to a novel method of retarding and/or preventing deterioration of the suspending medium and thereby to permit the use thereof for a considerably longer period of time than otherwise, with the resultant increased efficiency and improved economics of the sphere manufacture process.

In one embodiment of the present invention relates to a process which comprises forming inorganic oxide spheres in a water immiscible suspending medium containing the condensation product of an ortho-hydroxy aromatic aldehyde and an alkylene polyamine.

In a specific embodiment the present invention relates to the process which comprises forming silica spheres in an oil bath containing the condensation product of salicylaldehyde and 1,2-propylene diamine.

In another specific embodiment the present invention relates to the process which comprises introducing droplets of an alumina sol and hexamethylene tetramine into hydrocarbon oil containing the condensation product of salicylaldehyde and ortho-vanillin with 1,2-propylene diamine and maintained at an elevated temperature, therein causing the droplets to set to hydrogel spheres, and subsequently separating said spheres from the hydrocarbon oil.

From the heretofore description it is apparent that the novel features of the present invention may be utilized in the formation of hydrogel spheres from any suitable sol having the characteristic of setting into a gel. The sol may be formed from compounds of aluminum, silicon, titanium, zirconium, thorium, cerium, etc. The present invention is particularly applicable to the formation of gels comprising alumina or silica. The invention also may be utilized in the formation of cogels comprising two or more of these compounds.

The spheres may be utilized for any suitable purpose including dehydrating agents, contacting agents, catalysts, etc. and are particularly preferred for use in the preparation of catalysts for the conversion of organic compounds by impregnating or otherwise compositing one or more active catalytic components with the spheres. For example, in the manufacture of catalysts which are particularly suitable for use in the cracking of hydro-carbons, silica spheres may be impregnated or otherwise composited with an oxide of aluminum, magnesium, zirconium, vanadium, etc. or mixtures thereof. In the manufacture of catalysts which are particularly suitable for hydrogenation or dehydrogenation reactions, alumina spheres may be impregnated with an oxide of chromium, molybdenum, vanadium, tungsten, titanium, thorium, etc. or mixtures thereof.

In the manufacture of catalysts which are particularly suitable for the reforming of gasoline or naphtha in order to improve the antiknock properties thereof, alumina may be impregnated or otherwise composited with one or more of the metals or compounds of the noble metals, rare metals or those in the left hand column of group 6 of the periodic table. The alumina is particularly suitable for compositing with platinum, with or without combined halogen, and used for the reforming of gasoline or naphtha.

In the manufacture of silica spheres, a suitable silica compound, such as an alkali metal silicate and particularly water glass, is commingled with a suitable acid, such as sulfuric acid, hydrochloric acid, etc. and the resultant mixture or sol is passed in finely divided form into a water immiscible suspending medium. In a preferred method, droplets of the sol are passed into a hydrocarbon oil bath. The concentration of water glass and acid are controlled so that the sol sets into firm hydrogel spheres. The suspending medium preferably is maintained at room temperature although in some cases elevated temperature may be employed.

Any suitable suspending medium may be utilized in the manufacture of silica, alumina and the other inorganic oxides of the present invention. Preferred suspending mediums include Nujol, kerosene, selected fractions of gas oil, etc. It generally is preferred to utilize a suspending medium having a density less than that of the sol so that the sol may be dropped into the top of the suspending medium and the spheres are withdrawn from the bottom thereof. However, it is understood that a suspending medium having a density higher than that of the sol may be employed and the sol, in this embodiment, would be introduced at the bottom of a confined body of the fluid, whereby the droplets will rise slowly to the surface of the suspending medium, setting into a hydrogel during passage therethrough, and be withdrawn at the top of the suspending medium.

In accordance with the present invention the condensation product of a hydroxy aromatic aldehyde and an alkylene polyamine is incorporated in the suspending medium, and as will be shown by the following example, the addition of this compound serves to retard lowering of the interfacial tension between the sol and the suspending medium and thereby serves to prolong the useful life of the suspending medium to produce gel particles of substantially spherical shape. Further the addition of this compound serves to reduce the film of oil on the spheres which, in turn, serves to facilitate subsequent washing of the spheres.

Another important advantage to the process of the present invention is that the particular condensation product employed serves to react with the metals present in the oil. The presence of foreign metals as impurities in certain catalysts tends to seriously affect the catalytic properties thereof, even though the impurities are present in small amounts. It is known that hydrocarbon oils contain metallic constituents in small amounts and these metals may become adsorbed or otherwise retained in the spheres. The novel process of the present invention serves to tie up or deactivate these metals and thereby will avoid this harmful effect of the foreign metals. Furthermore, the reaction of the condensation product with the metals serves the additional function of deactivating the metals and preventing them from catalyzing undesirable reactions in the oil which otherwise would result in deterioration of the oil and render the oil unsatisfactory for further use in the production of spheres.

Referring again to the manufacture of silica spheres and utilizing hydrocarbon oil as the suspending medium, a particularly preferred method of removing the spheres from the forming zone is by means of a circulating stream of water positioned beneath the oil. The spheres are continuously withdrawn from the forming chamber and are directed to another zone wherein the spheres are washed with water to remove soluble compounds as, for example, sodium present in the water glass, acidic components introduced by the acid, etc. As hereinbefore set forth, the incorporation of the condensation product in the oil suspending medium will reduce the amount of oil retained on the spheres and thereby will improve the efficiency of the water washing treatment.

In the manufacture of alumina spheres, an alumina sol is commingled with a suitable organic basic compound reactable therewith to form gel particles, and the resultant mixture is then dispersed in finely divided form into the suspending medium. Any suitable alumina sol may be utilized in accordance with the present invention. In a preferred method the alumina sol is prepared from a chloride of aluminum, although it is understood that other aluminum salts, such as a nitrate of aluminum, etc. may be utilized but not necessarily with equivalent results.

Any suitable organic basic compound may be used in accordance with the present invention. Hexamethylene tetramine is particularly preferred. Other organic basic compounds include the reaction product of ammonia with acetaldehyde, propionaldehyde, etc., or ammonium acetate and preferably a mixture of ammonium acetate and ammonium hydroxide, the mixture having a pH of below about 8.5, etc.

The hexamethylene tetramine preferably is prepared as an aqueous solution containing from about 15% to about 40% by weight of hexamethylene tetramine for ease in handling and also because solutions within this range have been found to result in more firm gel spheres. The alumina sol and the solution of hexamethylene tetramine are commingled and, in a preferred embodiment of the invention, droplets thereof are passed into the suspending medium. In general it is preferred to use equal volumes of the sol and of the hexamethylene tetramine solution. However, it is understood that the ratios of these solutions may vary considerably and thus range to about 5 volumes or more of one solution per 1 volume of the other solution.

The mixture of sol and hexamethylene tetramine solution preferably are dropped at room temperature or below into the suspending medium which is maintained at an elevated temperature which generally is above room temperature and preferably is from about 120° to about 220° F. and still more preferably of from about 190° to about 210° F. The volume of suspending medium employed should be sufficient to allow the required time for the droplets to set into firm hydrogel spheres.

As hereinbefore set forth, the oil used in the forming zone deteriorates with use and results in flat or ellipsoidal pellets. In accordance with the present invention, a particular condensation product is incorporated in the oil used in the forming zone. In one embodiment of the invention, the condensation product may be added to the oil either before or after introduction into the forming zone and, when desired, additions of the condensation product to the oil may be made periodically.

As hereinbefore set forth, the condensation product of a hydroxy aromatic aldehyde and an alkylene polyamine is incorporated in the suspending medium. The hydroxy aromatic aldehyde for use in accordance with the present invention must contain a hydroxy group in a position ortho to the aldehyde group. Preferred aromatic aldehydes comprise salicylaldehyde (2-hydroxy-benzaldehyde), ortho-vanillin (2-hydroxy-3-methoxy benzaldehyde), etc. Other suitable but not necessarily equivalent aldehydes include 2-hydroxy-3-alkyl-benzaldehyde, 1-hydroxy-naphthaldehyde-2, anthrol-2-aldehyde-1, etc., as well as polyhydroxy aromatic aldehydes including 2,4-dihydroxy benzaldehyde, 2,6-dihydroxy benzaldehyde, etc., similarly substituted naphthaldehydes, etc. It is understood that the aromatic ring may contain other substituents including those of halogen, amino, nitro, carboxy, alkoxy, etc.

Any suitable alkylene polyamine may be used in accordance with the present invention. Preferred alkylene polyamines comprise 1,2-propylene diamine, 1,3-propylene diamine, ethylene diamine, diethylene triamine, triethylene tetramine, etc.

The condensation of the hydroxy aromatic aldehyde and alkylene polyamine may be effected in any suitable manner. This reaction is readily effected at room temperature upon mixing of the reactants and generally is effected in the presence of an organic solvent in order to facilitate removal of the water from the reaction. Suitable solvents include benzene, alcohols such as methyl alcohol, propyl alcohol, etc., ethers such as diethyl ether, etc. The water formed in the reaction may be removed by draining as, for example, when a water-immiscible solvent, such as hydrocarbons, is employed, and/or by distillation particularly when a water soluble solvent, such as alcohol, is used. It is understood that the various condensation products which may be prepared and used in accordance with the present invention are not necessarily equivalent in their activity but all of them will serve to retard undesirable deterioration of the suspending medium.

The condensation product generally will be utilized in a concentration of from about 0.0001% to 0.5% or more by weight of the oil. It is understood that the condensation product may be utilized in a suitable solvent, including alcohols, ethers, ketones, etc., when desired, and also that the condensation product may be used along with other additives to be incorporated in the oil.

The spheres formed in the above manner generally are treated with aqueous solutions in subsequent handling as, for example, washing of the spheres with water or other aqueous solutions. As hereinbefore set forth, the addition of the condensation product to the suspending medium will reduce the retention of the suspending medium on or in the spheres and thus will facilitate the subsequent aqueous treatment.

As a further means of retarding deterioration of the suspending medium, the forming step may comprise a closed zone which will exclude air and other constituents of the atmosphere from contacting the suspending medium. Preferably a blanket of nitrogen or other gas is maintained above the suspending medium and preferably is at a pressure at least slightly above atmospheric so that any leaks will be to the atmosphere instead of the reverse. This readily may be accomplished by introducing a continuous stream of nitrogen or other inert gas at a pressure of from about 2 to 10 pounds per square inch or more, into the upper portion of the forming zone.

After treatment of the spheres in the manner herein set forth above, the spheres may be treated in any suitable manner. When used as adsorbent, contacting agent, etc., the spheres may be dried at a temperature of from about 200° to about 500° F. and then may be calcined at a temperature of from about 800° to about 1400° F. or more. When utilized as a support or carrier for catalysts, the spheres may be impregnated or otherwise composited with the other component or components in any suitable manner and then calcined as aforesaid. In some cases it is desirable to dry and calcine the spheres, composite with the other components, and then further dry and calcine the spheres. When composited with one or more of the metals and/or compounds in groups 4, 5, 6 and 8 of the periodic table, the resultant catalysts are suitable for use in cracking, reforming, hydrogenation, dehydrogenation, cyclization, desulfurization, etc. of hydrocarbons or other organic compounds.

The following example is introduced to illustrate further the novelty and utility of the present invention but not with the intention of unduly limiting the same.

*Example*

A mixed condensation product was prepared by reacting ortho-vanillin, salicylaldehyde and 1,2-propylene diamine at room temperature. The reaction proceeded vigorously upon mixing the reactants. Benzene was used as the solvent, and the water of reaction was removed by distillation and removal of a water-benzene azeotrope as an overhead stream.

The suspending medium used in this example was a Pennsylvania light spindle oil which had an initial interfacial tension against water of 32.5 dynes/cm.

An accelerated test has been devised to evaluate the effect of additives to the suspending medium. This test comprises subjecting the suspending medium to 100 pounds per square inch of oxygen pressure at 212° F. for 16 hours. This accelerated test simulates the conditions encountered in the forming step of the alumina sphere manufacturing process but is more severe due to the high oxygen pressure, and thereby serves to evaluate an additive without requiring a long time run in the plant. The results obtained in this test correlate well with those obtained in actual plant operation.

When tested in the above manner, the oil without additive decreased in interfacial tension against water to 11.2 dynes/cm. However, upon the addition of 0.1% by weight of the above mentioned condensation product, the suspending medium, when tested in the above manner, had an interfacial tension against water of about 20 dynes/cm.

It appears that an interfacial tension of about 20 dynes/cm. is critical and that an oil having an interfacial tension of below about 20 is unsatisfactory in producing substantially spherical pellets, while oil having an interfacial tension above about 20 is satisfactory for this purpose. Thus it is seen that the addition of the condensation product of the present invention served to prevent deterioration of the oil to below the critical limit of 20 and, therefore, the oil will be satisfactory for use for a considerably longer period of time than in the absence of the condensation product.

I claim as my invention:

1. A method of forming spherical particles of an inorganic oxide which comprises introducing droplets of a sol of said oxide into a body of hydrocarbon oil containing the condensation product of an ortho-hydroxy aromatic aldehyde and an alkylene polyamine in sufficient amount to retard deterioration of said oil, and retaining the droplets in the oil body for a sufficient time to cause the droplets to set to hydrogel spheres.

2. The method of claim 1 further characterized in that said aldehyde comprises salicylaldehyde.

3. The method of claim 2 further characterized in that said polyamine is 1,2-propylene diamine.

4. The method of claim 1 further characterized in that said aldehyde comprises ortho-vanillin.

5. The method of claim 4 further characterized in that said polyamine is 1,2-propylene diamine.

6. In the forming of inorganic oxide spheres by converting a sol of said inorganic oxide to a hydrogel within a hydrocarbon suspending medium, wherein the interfacial tension between said sol and said suspending medium decreases with use, the improvement which comprises incorporating in said suspending medium from about 0.0001% to 0.5% by weight of the condensation product of an ortho-hydroxy aromatic aldehyde with an alkylene polyamine.

7. In the forming of silica spheres by introducing droplets of a silica sol into a hydrocarbon oil and therein causing the droplets to set to hydrogel spheres, wherein the interfacial tension between the sol and said hydrocarbon oil decreases with use, the improvement which comprises incorporating in said hydrocarbon oil from about 0.0001% to about 0.5% by weight of the condensation product of salicylaldehyde and an alkylene polyamine.

8. In the forming of silica spheres by introducing droplets of a silica sol into a hydrocarbon oil and therein causing the droplets to set to hydrogel spheres, wherein the interfacial tension between the sol and said hydrocarbon oil decreases with use, the improvement which comprises incorporating in said hydrocarbon oil from about 0.0001% to about 0.5% by weight of the condensation product of salicylaldehyde and 1,2-propylene diamine.

9. In the forming of silica spheres by introducing droplets of a silica sol into a hydrocarbon oil and therein causing the droplets to set to hydrogel spheres, wherein the interfacial tension between the sol and said hydrocarbon oil decreases with use, which comprises incorporating in said hydrocarbon oil from about 0.0001% to about 0.5% by weight of the condensation product of ortho-vanillin and an alkylene polyamine.

10. In the forming of silica spheres by introducing droplets of a silica sol into a hydrocarbon oil and therein causing the droplets to set to hydrogel spheres, wherein the interfacial tension between the sol and said hydrocarbon oil decreases with use, the improvement which comprises incorporating in said hydrocarbon oil from about 0.0001% to about 0.5% by weight of the condensation product of ortho-vanillin and 1,2-propylene diamine.

11. In a process of forming alumina spheres by commingling an alumina sol and an organic basic compound reactable therewith and introducing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said oil from about 0.0001% to about 0.5% by weight of the condensation product of ortho-hydroxy aromatic aldehyde and an alkylene polyamine.

12. In a process for the manufacture of alumina spheres by commingling an alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.0001% to about 0.5% by weight of the condensation product of salicylaldehyde and 1,2-propylene diamine.

13. In a process for the manufacture of alumina spheres by commingling an alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.0001% to about 0.5% by weight of the condensation product of ortho-vanillin and 1,2-propylene diamine.

14. The process which comprises commingling an alumina sol with hexamethylene tetramine and passing droplets of the resultant mixture into a hydrocarbon oil maintained at an elevated temperature and containing from about 0.0001% to about 0.5% by weight of the condensation product of an ortho-hydroxy aromatic aldehyde and an alkylene polyamine, retaining the droplets in the oil for a sufficient time to form hydrogel spheres, and maintaining an inert atmosphere above said oil during the formation of the spheres.

15. The process which comprises commingling an alumina sol with hexamethylene tetramine and passing droplets of the resultant mixture into a hydrocarbon oil maintained at an elevated temperature and containing from about 0.0001% to about 0.5% by weight of the condensation product of a salicylaldehyde and a 1,2-propylene diamine, retaining the droplets in the oil for a sufficient time to form hydrogel spheres, and maintaining an inert atmosphere above said oil during the formation of the spheres.

16. The process which comprises commingling an alumina sol with hexamethylene tetramine and passing droplets of the resultant mixture into an oil maintained at an elevated temperature and containing from about 0.0001% to about 0.5% by weight of the condensation product of ortho-vanillin and a 1,2-propylene diamine, retaining the droplets in the oil for a sufficient time to form hydrogel spheres, separating said spheres from said oil, and maintaining an inert atmosphere above said oil during the formation of the spheres.

CHARLES WANKAT.

References Cited in the file of this patent

UNITED STATES PATENTS

| Number | Name | Date |
| --- | --- | --- |
| 2,505,895 | Heard | May 2, 1950 |